(12) United States Patent
Wice

(10) Patent No.: US 8,901,895 B2
(45) Date of Patent: Dec. 2, 2014

(54) STORED ENERGY DISCHARGE APPARATUS AND METHOD

(75) Inventor: Brian A. Wice, West Allis, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 703 days.

(21) Appl. No.: 13/205,926

(22) Filed: Aug. 9, 2011

(65) Prior Publication Data

US 2013/0038986 A1 Feb. 14, 2013

(51) Int. Cl.
*H02J 7/00* (2006.01)
*H02J 7/34* (2006.01)

(52) U.S. Cl.
CPC ...................... *H02J 7/345* (2013.01)
USPC ........................................................ 320/167

(58) Field of Classification Search
CPC ........ H02J 7/345; H02J 7/0016; Y02E 60/13; H01G 9/155; Y02T 10/7022
USPC ........................................................ 320/167
See application file for complete search history.

(56) References Cited

U.S. PATENT DOCUMENTS

| | | | |
|---|---|---|---|
| 4,371,829 A | 2/1983 | Salowe et al. | |
| 4,504,773 A | 3/1985 | Suzuki et al. | |
| 6,104,953 A | 8/2000 | Leyde | |
| 6,230,054 B1 | 5/2001 | Powers | |
| 6,549,386 B1 | 4/2003 | Koegel et al. | |
| 6,744,612 B2 | 6/2004 | Chen | |
| 7,200,015 B1 | 4/2007 | Mirskiy | |
| 7,680,533 B2 | 3/2010 | Garrett et al. | |
| 2007/0103114 A1* | 5/2007 | Hoffman | 320/114 |
| 2009/0302807 A1* | 12/2009 | Reiter et al. | 320/167 |
| 2010/0019737 A1* | 1/2010 | Leboeuf | 320/167 |
| 2010/0026242 A1 | 2/2010 | Forslow | |
| 2011/0155494 A1* | 6/2011 | Haas | 180/206.1 |
| 2012/0181956 A1* | 7/2012 | Rossel | 318/376 |

FOREIGN PATENT DOCUMENTS

| | | |
|---|---|---|
| JP | 06-060909 | 3/1994 |
| JP | 2004-282822 | 10/2004 |
| JP | 2009-189221 | 8/2009 |

OTHER PUBLICATIONS

International Search Report and Written Opinion for PCT Application No. PCT/US2012/049010, mail date Dec. 17, 2012, 9 pages.

\* cited by examiner

*Primary Examiner* — Arun Williams
(74) *Attorney, Agent, or Firm* — Foley & Lardner LLP

(57) ABSTRACT

A method, system, and apparatus for providing energy discharge capability for a junction box that includes at least one ultra- or super-capacitor. A discharge resistor is connected to a first terminal block of the junction box. A normally-open relay is connected to a second terminal block of the junction block, the relay being connected in series between the discharge resistor and the second terminal block. The normally-open relay is closed to create a discharge path for discharging energy stored in the at least one ultra- or super-capacitor. The junction box is capable of being safely serviced after the energy stored in the at least one ultra- or super-capacitor has been discharged by way of the discharge path.

16 Claims, 5 Drawing Sheets

STORED ENERGY DISCHARGE APPARATUS AND METHOD

BACKGROUND

Stored energy discharge circuitry is provided for a junction box having super capacitors and/or ultra capacitors, so as to discharge the capacitors prior to a technician servicing the junction boxes. That way, the technician will not be subject to a hazard (e.g., electrical shock) when performing electrical servicing of components within the junction box.

One conventional method to perform stored energy discharge of a junction box having at least one super capacitor or at least one ultra capacitor is the "hot stick discharging method." In this method, a person physically takes the flying leads of a special purpose resistor and connects those leads to the positive and negative terminals of the super-capacitor or ultra-capacitor. The term "hot stick" refers to the use of sticks attached to the leads of the special purpose resistor, to give the person discharging the capacitor some distance for safety. It is typical for electric arc flash to occur when the connection is made in this manner, which provides a safety hazard to the person attaching the flying leads, no matter how far away that person is from the capacitor being coupled to the flying leads.

It is desirable to come up with a safer way to discharge stored energy of a super-capacitor or ultra-capacitor provided in a junction box than what is provided in the hot stick discharging method.

SUMMARY

In general, one innovative aspect of the subject matter described in this specification can be embodied in a method for providing energy discharge capability for a junction box that includes at least one ultra- or super-capacitor, which includes:

connecting a discharge resistor to a first terminal block of the junction box; and connecting a normally-open relay to a second terminal block of the junction block, the relay being connected in series between the discharge resistor and the second terminal block; and closing the normally-open relay and thereby creating a discharge path for discharging energy stored in the at least one ultra- or super-capacitor, wherein the junction box is capable of being safely serviced after the energy stored in the at least one ultra- or super-capacitor has been discharged by way of the discharge path.

Other embodiments of this aspect include corresponding systems, apparatuses, and computer readable-media, configured to perform the actions of this method.

Particular embodiments of the subject matter described in this specification can be implemented so as to realize one or more of the following advantages: a) a safer way for a technician to discharge energy from a super-capacitor and/or an ultra-capacitor provided in a junction box prior to the technician servicing the junction box, and b) allow for safely discharging a plurality of junction boxes each having at least one super-capacitor or ultra-capacitor and each having an energy discharge circuit.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The present specification is directed to a method and apparatus for providing stored energy discharge circuitry to a junction box of energy storage capacitor devices, such as one having a super capacitor and/or an ultra capacitor. In at least one exemplary embodiment, the existing junction box is replaced with one that includes circuitry to safely discharge the stored energy in the event that servicing of an electrical system that includes the junction box is required.

Figure 4:
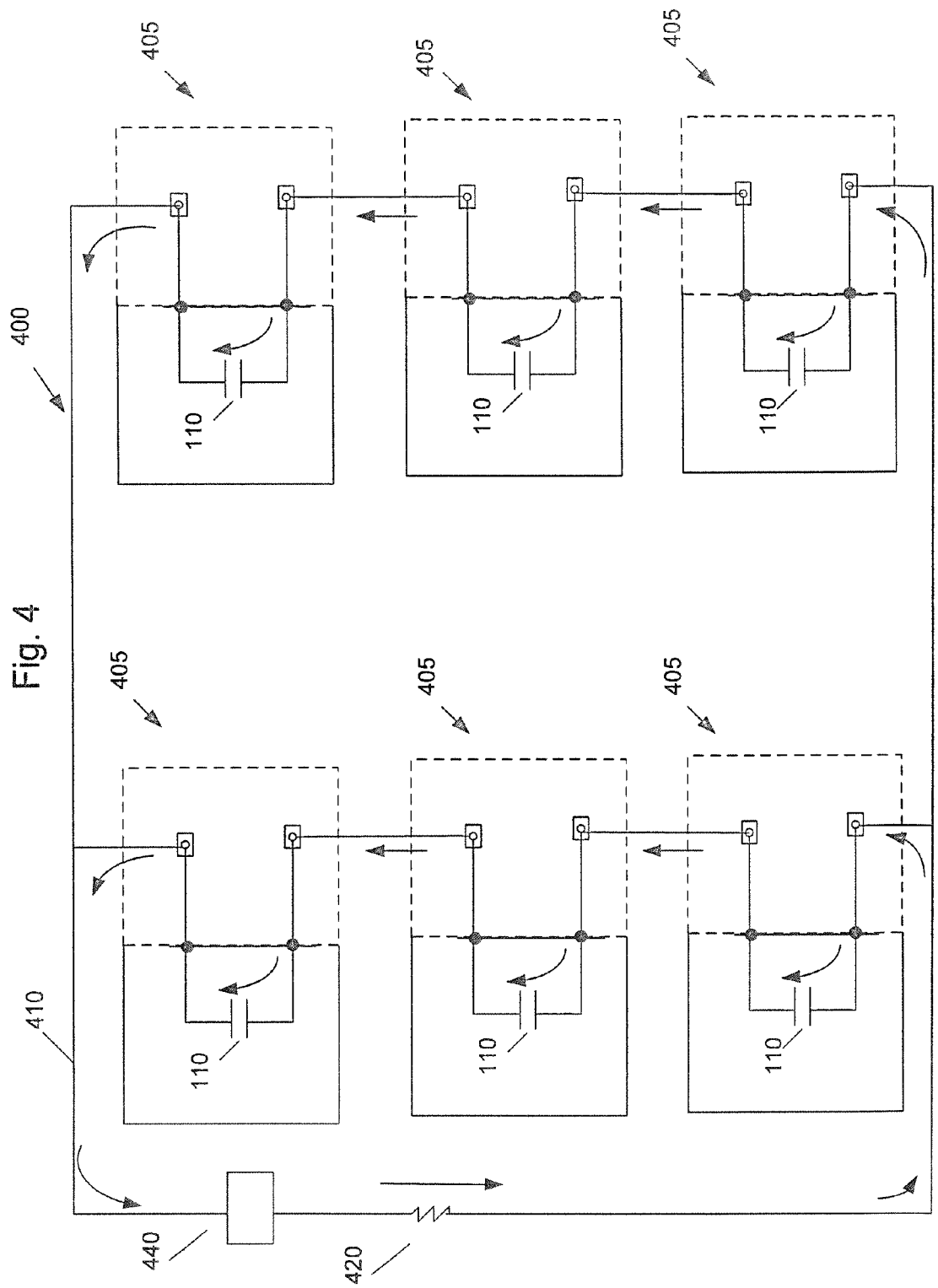
FIG. 4 is a diagram showing a plurality of junction boxes connected in a series/parallel relationship with conventional energy discharge circuitry provided external to the junction boxes.

FIG. 4 is a circuit diagram of a conventional energy discharge circuit 400 used for an array of ultra- or super-capacitors. The array of ultra- or super-capacitors is shown as three series-connected capacitors connected in parallel to three other series-connected capacitors (that is, three series-connected junction boxes 405 connected in parallel to three other series-connected junction boxes 405). In FIG. 4, a single discharge path 410 is utilized to discharge the array of ultra- and super-capacitors 110, in which the stored energy of the array of ultra- and/or super-capacitors 110 are discharged as heat across the discharge resistor 420 when a relay 440 is switched to a CLOSED state. In the energy discharge circuit of FIG. 4, the array of ultra- and/or super-capacitors 110 will be safely discharged by way of the single discharge path 410, unless there is a circuit failure that causes the discharge path 410 to open. For example, a problem with a component in the discharge path, i.e., a contactor, the discharge resistor 420, wire, connections, etc., will result in the array of ultra- and/or super-capacitors 110 not being able to be discharged via the single discharge path 410, which would then result in an unsafe and hazardous condition for a servicing technician.

Figure 1:
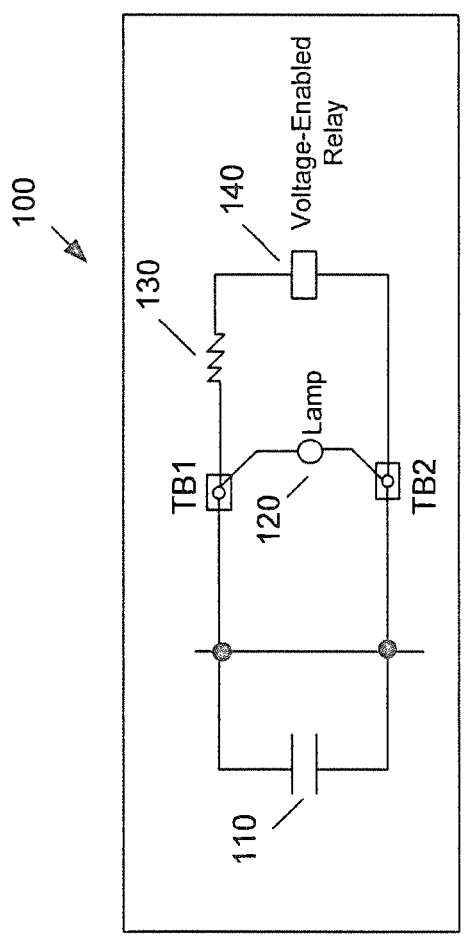
FIG. 1 is a diagram showing a junction box having energy discharge circuitry according to a first embodiment.

FIG. 1 is a circuit diagram showing a junction box having stored energy discharge circuitry according to a first embodiment. The junction box is provided with a super- and/or ultra-capacitor 110, along with other elements (not shown in FIG. 1). A lamp 120 is provided between two terminal blocks TB1, TB2, to provide a visual indication as to whether or not the capacitor 110 is discharged, whereby the lamp turns OFF when the capacitor 110 is fully discharged and stays ON otherwise.

Typical safety specifications for electrical junction boxes require that a super- or ultra-capacitor be discharged to a voltage of 50 V or less after five minutes of discharging.

FIG. 1 also shows a discharge resistor 130 provided on a discharge path, in which energy from the capacitor 110 is discharged by way of heat provided on the discharge resistor 130. By way of example and not by way of limitation, the discharge resistor 130 has a resistance value of 4 ohms for discharging a standard super- or ultra-capacitor provided in the junction box to a level of 50 V or less within five minutes of discharging, whereby one skilled in the art will recognize that the resistance value of the discharge resistor 130 is set based on the particular capacitance of the super- or ultra-capacitor 110 to be discharged via the discharge resistor 130.

Also provided on the discharge path between terminal blocks TB1 and TB2 is a voltage-enabled relay 140. When an external voltage +V is applied to the relay 140, the relay 140 closes, thereby providing a discharge path for energy from the capacitor 110 to pass across the discharge resistor 130 and thereby be dissipated as heat when it passes across the discharge resistor 130. The relay 140 is normally in an OPEN state, whereby a voltage +V applied to the relay 140 closes the relay 140 to thereby create the discharge path between terminal blocks TB1 and TB2. In one possible implementation, a Series 1-DC relay made by Crydom Corporation can be used as the relay 140, whereby one skilled in the art will recognize that other types of solid-state relays may be utilized while remaining within the spirit and scope of the invention.

With the relay 140 in the CLOSED state, stored energy within the super- or ultra-capacitor 110 is discharged via the discharge path. When the lamp 120 turns OFF, that provides a visual indication to a technician that the junction box is safe to be serviced by the technician without any risk of electrical shock to the technician. When the technician is finished servicing the junction box, the voltage is no longer applied to the relay 140, thereby turning OFF the relay 140 and disabling the discharge path.

Figure 2:
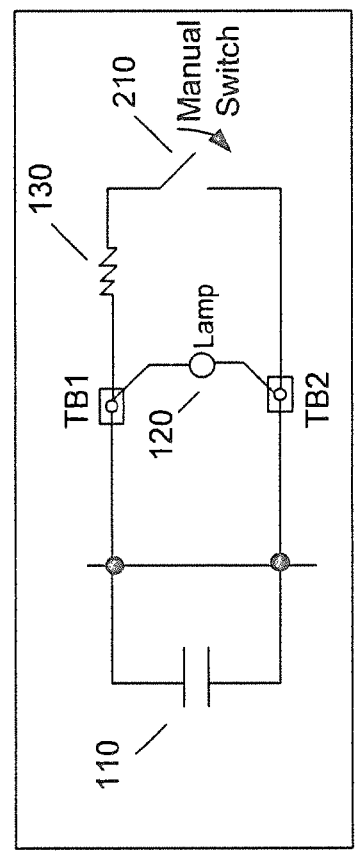
FIG. 2 is a diagram showing a junction box having energy discharge circuitry according to a second embodiment.

FIG. 2 is a circuit diagram showing a junction box having stored energy discharge circuitry according to a second embodiment. The second embodiment is similar to the first embodiment, except for the use of a manual switch 210 instead of a voltage-enabled relay 140. In the second embodiment, a technician physically moves the switch from a normally OPEN state to a CLOSED state, so as to create a discharge path between the terminal blocks TB1 and TB2, to thereby start the process of discharging stored energy within the super- or ultra-capacitor 110. When the capacitor 110 is fully discharged, the lamp 120 turns OFF, thereby signaling to the technician that it is now safe to perform servicing of the junction box When the technician is finished servicing the junction box, the technician physically switches the manual switch back to its OPEN state, thereby disabling the discharge path.

Figure 3:
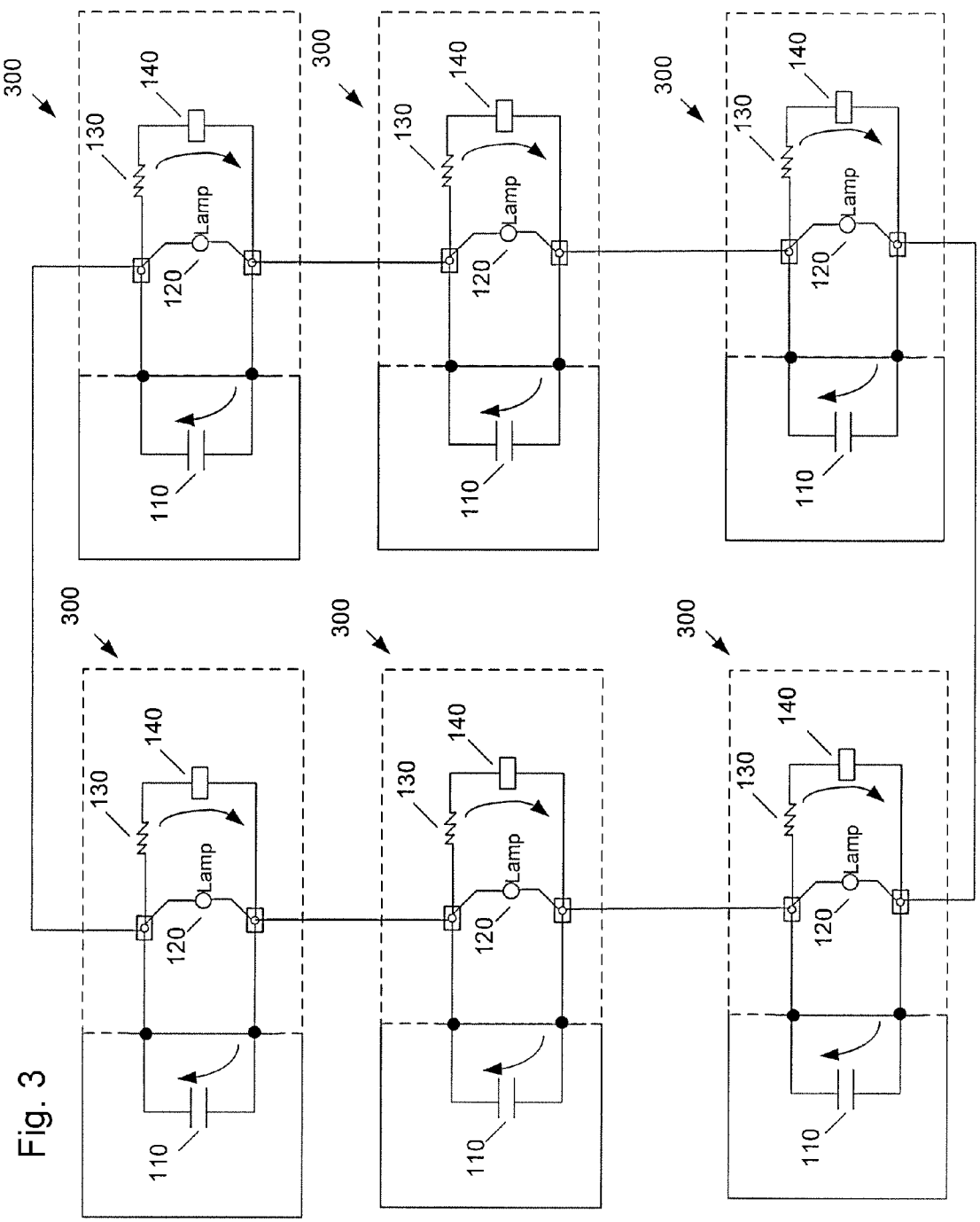
FIG. 3 is a diagram showing a plurality of junction boxes connected in a series/parallel relationship with each junction box having energy discharge circuitry according to a third embodiment.

FIG. 3 shows a third embodiment of the invention for discharging an array of capacitors, in which multiple junction boxes 300 each having at least one ultra- or super-capacitor 110, are connected as two parallel connected groups of three series-connected capacitors. In the third embodiment, the junction boxes are preferably discharged at the same time, but this need not always be the case. The third embodiment is shown in FIG. 3 using voltage-enabled relays 140 in the manner as utilized in the first embodiment, whereby alternatively manual switches such as utilized in the second embodiment can be instead (or a mix of voltage-enabled relays and manual switches can be utilized). As shown by way of the arrows in FIG. 3, each junction box 300 has its own separate discharge path for discharging energy stored in a super- or ultra-capacitor provided within that junction box 300, in which a discharge resistor 130 and relay 140 are provided on each discharge path. When the discharging of the array of capacitors is complete, such as indicated by the lamps turning OFF from an ON state, a technician can then safely service these junction boxes. When the servicing of the junction boxes is complete, the voltage applied to the relays 140 is removed, thereby disabling each discharge path by the relays 140 being set to an OPEN state.

In the third embodiment as shown in FIG. 3, in contrast to the conventional discharge system as shown in FIG. 4, due to the use of separate discharge paths, one for each junction box, and due to the use of energy discharge circuitry provided for each junction box, a failure of one of those separate discharge paths will only affect the discharging of the ultra- and super-capacitor 110 provided within the junction box and not the discharging of the other ultra- and super-capacitors 110 in the other junction boxes. As such, the third embodiment provides for a safer energy discharge system than the conventional discharge system.

The energy discharge circuit of the third embodiment as shown in FIG. 3 provides a mechanism of safely discharging an array of ultra- or super-capacitors and keeping those capacitors safely discharged when they are being serviced by a technician. Other types of connectivities of ultra- or super-capacitors can be discharged by using an energy discharge circuit of the third embodiment, such as an array of capacitors connected in a different series and parallel combination than shown in FIG. 3, while remaining within the spirit and scope of the invention. The proper selection of resistance for the discharge resistors will be based on the particular connectivity of the array of super- or ultra-capacitors, so as to meet specific energy discharge requirements (e.g., discharge each capacitor to 50 V or less within five minutes of discharge). In more detail, the RC time constant (R being the resistance of the discharge resistor and C being the capacitance of the ultra- or super-capacitor) sets the rate of discharge of the capacitor when the relay is CLOSED to thereby enable the discharge path. It is straightforward for one of ordinary skill in the art to compute an appropriate discharge resistor value to achieve a desired discharge rate so as to discharge a capacitor from a voltage of Vo volts to a voltage of V1 volts after M seconds.

Figure 5:
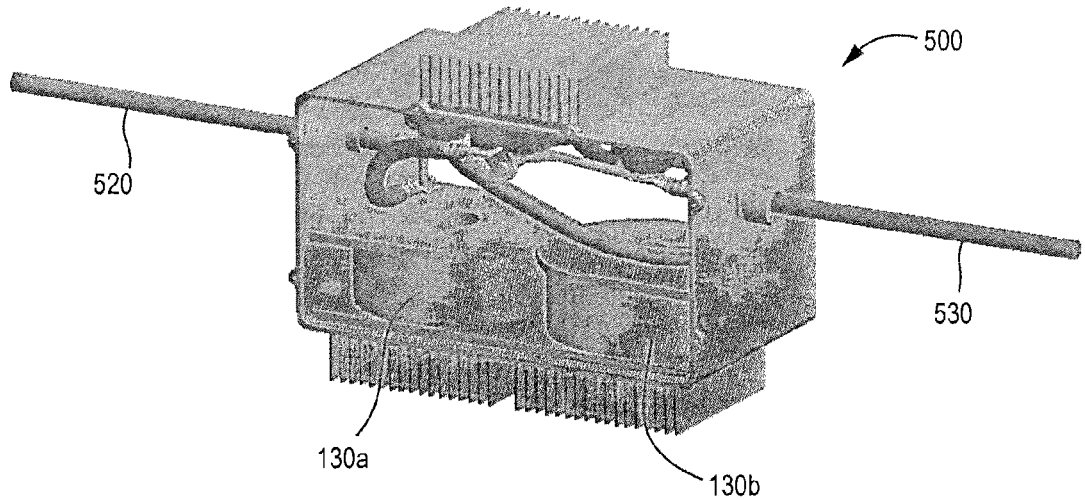
FIG. 5 is a diagram showing a front perspective view of a junction box having energy discharge circuitry according to an exemplary embodiment.

FIG. 5 shows a front perspective view of an energy discharge circuitry portion 500 of a junction box according to an exemplary embodiment. Two series connected discharge resistors 130a, 130b correspond to the discharge resistor 130 of FIGS. 1-3. Connections 520 and 530 provide connectivities to other junction boxes and/or other components in a system that uses junction boxes (not shown, but see FIG. 3).

Figure 6:
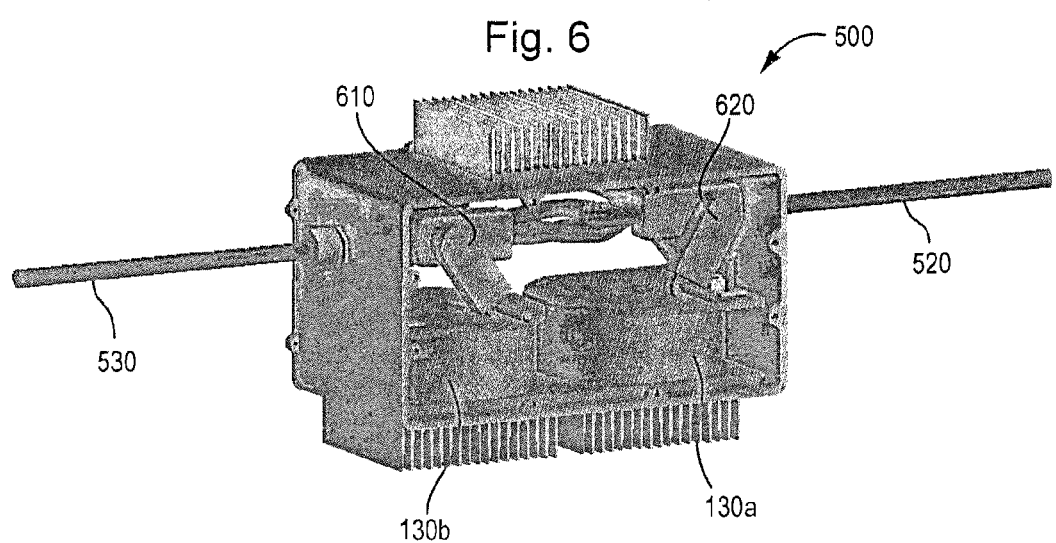
FIG. 6 is a diagram showing a rear perspective view of a junction box having energy discharge circuitry according to an exemplary embodiment.
Figure 7:
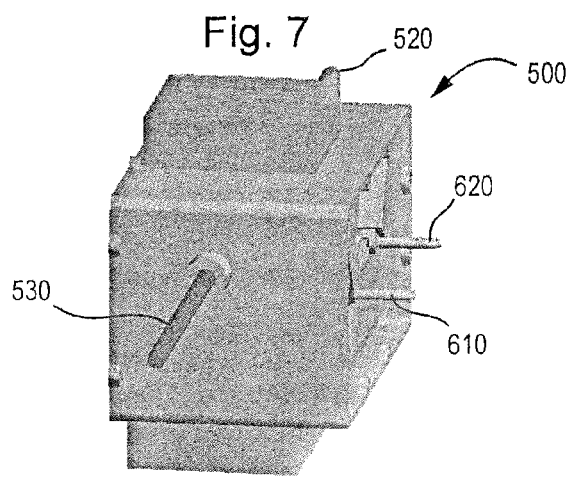
FIG. 7 is a diagram showing a side view of a junction box having energy discharge circuitry according to an exemplary embodiment.

FIG. 6 shows a rear perspective view and FIG. 7 shows a side view of an energy discharge circuitry portion 500 of a junction box according to an exemplary embodiment. Two connector leads 610, 620 for connecting to a super- and/or ultra-capacitor (not shown) are provided.

Figure 8:
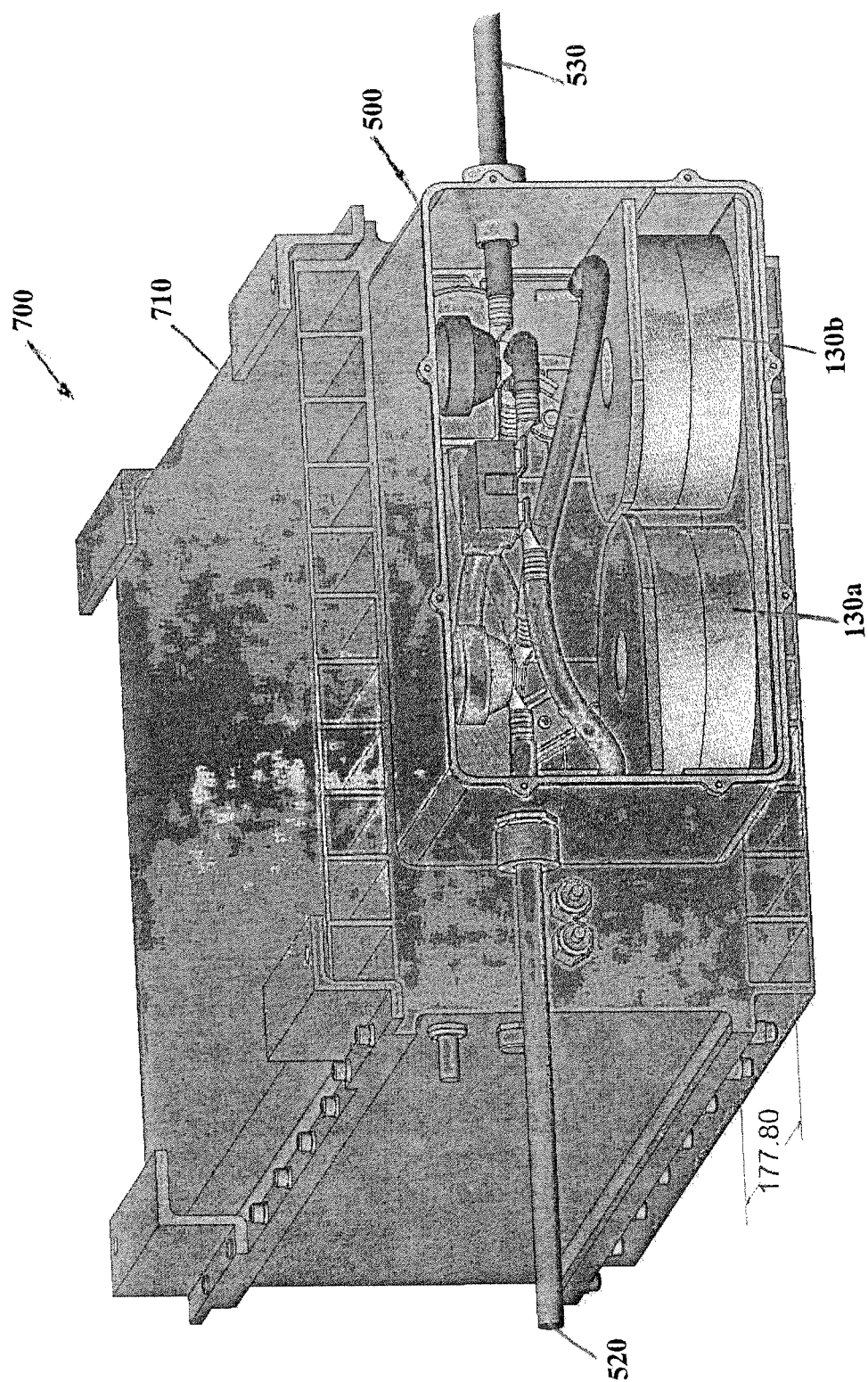
FIG. 8 is a diagram showing a front perspective view of a junction box having energy discharge circuitry connected to an ultra- or super-capacitor according to an exemplary embodiment.

FIG. 8 shows the entire junction box 700 having an energy discharge circuitry portion 500 and having a super- and/or ultra-capacitor 710 according to an exemplary embodiment, in which the connector leads 610, 620 (see FIG. 6) provide connectivity between the energy discharge circuitry portion 500 and the super- and/or ultra-capacitor 710. By way of example and not by way of limitation, the energy discharge circuitry portion 500 adds an additional 177.80 mm to the width of a standard junction box, while not affecting its total height and length.

According to various embodiments, the processes that effectuate illustrative embodiments that are described herein can be implemented by a computing system in response to a processor executing an arrangement of instructions contained in a main memory. Such instructions can be read into main memory from another computer-readable medium, such as a storage device. Execution of the arrangement of instructions contained in main memory causes the computing system to perform the illustrative processes described herein. One or more processors in a multi-processing arrangement may also be employed to execute the instructions contained in main memory. In alternative embodiments, hard-wired circuitry may be used in place of or in combination with software instructions to implement illustrative embodiments. Thus, embodiments are not limited to any specific combination of hardware circuitry and software.

Although an example processing method and system has been described with reference to the exemplary embodiments, implementations of the subject matter and the functional operations described in this specification can be implemented in other types of digital electronic circuitry, or in computer software, firmware, or hardware, including the structures disclosed in this specification and their structural equivalents, or in combinations of one or more of them.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing energy discharge capability for a junction box that includes at least one ultra- or super-capacitor, comprising:
    connecting a discharge resistor to a first terminal block of the junction box; and
    connecting a normally-open relay to a second terminal block of the junction box, the relay being connected in series between the discharge resistor and the second terminal block; and
    closing the normally-open relay and thereby creating a discharge path for discharging energy stored in the at least one ultra- or super-capacitor,
    wherein the junction box is capable of being safely serviced after the energy stored in the at least one ultra- or super-capacitor has been discharged by way of the discharge path.

2. The method according to claim 1, wherein the normally-open relay is a manual switch.

3. The method according to claim 1, wherein the normally-open relay is a voltage-enabled relay.

4. The method according to claim 1, further comprising:
    connecting a lamp across the first and second terminal blocks to provide a visual indication as to whether or not the at least one ultra- or super-capacitor has been sufficiently discharged.

5. The method according to claim 1, wherein the junction box is connected to at least one other junction box that includes at least one other ultra- or super-capacitor in either a series or parallel connection.

6. A junction box comprising:
    at least one ultra- or super-capacitor;
    a first terminal block connected to a first end of the least one ultra- or super-capacitor;
    a second terminal block connected to a second end of the least one ultra- or super-capacitor;
    a discharge resistor connected to the first terminal block; and
    a normally-open relay connected to the second terminal block, the relay being connected in series between the discharge resistor and the second terminal block;
    wherein the normally-open relay is closed to create a discharge path for discharging energy stored in the at least one ultra- or super-capacitor, and
    wherein the junction box is capable of being safely serviced after the energy stored in the at least one ultra- or super-capacitor has been discharged by way of the discharge path.

7. The junction box according to claim 6, wherein the normally-open relay is a manual switch.

8. The junction box according to claim 6, wherein the normally-open relay is a voltage-enabled relay.

9. The junction box according to claim 6, further comprising:
    a lamp connected across the first and second terminal blocks to provide a visual indication as to whether or not the at least one ultra- or super-capacitor has been sufficiently discharged.

10. The junction box according to claim 6, wherein the junction box is connected to at least one other junction box that includes at least one other ultra- or super-capacitor in either a series or parallel connection.

11. A non-transitory computer readable medium having a computer program encoded therein, which, when executed by at least one computer, causes the computer to provide an energy discharge capability for a junction box that includes at least one ultra- or super-capacitor, in which the computer performs the steps of:
- connect a discharge resistor to a first terminal block of the junction box; and
- connect a normally-open relay to a second terminal block of the junction box, the relay being connected in series between the discharge resistor and the second terminal block; and
- close the normally-open relay and thereby creating a discharge path for discharging energy stored in the at least one ultra- or super-capacitor,
- wherein the junction box is capable of being safely serviced after the energy stored in the at least one ultra- or super-capacitor has been discharged by way of the discharge path.

12. The computer readable medium according to claim 11, wherein the normally-open relay is a manual switch.

13. The computer readable medium according to claim 11, wherein the normally-open relay is a voltage-enabled relay.

14. The computer readable medium according to claim 11, the computer program further causing the computer to perform the step of:
- connect a lamp across the first and second terminal blocks to provide a visual indication as to whether or not the at least one ultra- or super-capacitor has been sufficiently discharged.

15. The computer readable medium according to claim 11, wherein the junction box is connected to at least one other junction box that includes at least one other ultra- or super-capacitor in either a series or parallel connection.

16. The computer readable medium according to claim 15, the computer program further causing the computer to perform the step of:
- setting a resistance value for the discharge resistor based on the series or parallel connection of the ultra- or super-capacitors and based on predetermined energy discharge requirements.

* * * * *